Patented Mar. 24, 1942

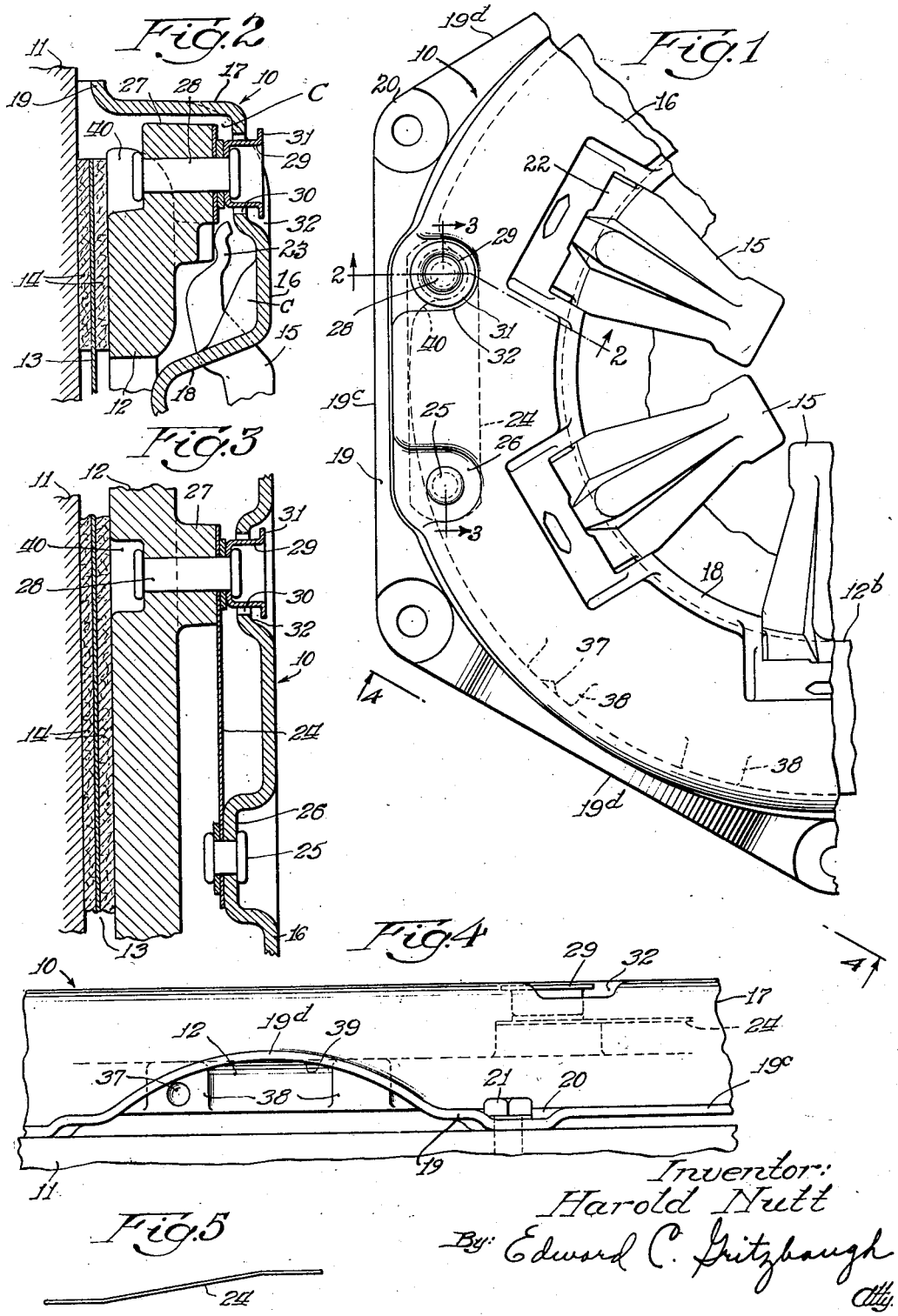

2,277,557

UNITED STATES PATENT OFFICE 2,277,557

FRICTION CLUTCH

Harold Nutt, Chicago, Ill., assignor to Borg-Warner Corporation, Chicago, Ill., a corporation of Illinois Application February 23, 1940, Serial No. 320,258

3 Claims. (Cl. 192—68)

This invention relates to friction clutches of the type wherein the drive from the clutch cover to the pressure plate is transmitted through a flexible link, one end of which is secured to the pressure plate and the other end of which is secured to the cover, the flexibility of the link allowing the pressure plate to move axially in order to effect clutch engagement. One of the objects of the invention is to provide a clutch embodying an improved drive of this type, wherein the link is arranged in such a manner that it will transmit maximum torque without bending or buckling under the driving strain or as a result of radial expansion of the plate under heat developed by the friction faces.

To this end, the invention contemplates in general the employment of a driving link in the form of a straight flexible metal strap, of spring steel or the like, arranged in a chordal position with respect to a circumference of the axis of rotation, with its leading end attached to the driving member and its trailing end attached to the pressure plate so that the drive is transmitted through it in the form of a straight chordal pull along its longitudinal axis.

The invention contemplates a flexible drive arrangement which combines maximum torque transmitting strength with maximum simplicity and minimum cost of construction. It is particularly desired to provide such a flexible drive arrangement in a friction clutch of maximum compactness in an axial direction. The invention further aims to embody an improved flexible drive arrangement of the type specified in a friction clutch wherein the lever fulcrum or reaction member is of a preferred type, i. e., in the form of an annular cover, roughly channel-shaped in cross-section, which cooperates with the flywheel of the clutch to form an annular space in which the pressure plate is enclosed.

These objects are attained by providing an arrangement wherein the driving links are accommodated within the annular cover between the rear wall thereof and the rear side of the pressure plate. Being arranged chordally, the link may be of ample length and still be accommodated in the cover without crowding. In this position, the link is enclosed and protected, and may be connected directly to the pressure plate at one end and to the cover plate at the other end by simple and inexpensive attaching means, such as rivets or bolts, and without the use of intervening brackets or the like.

Another feature of the invention, directed to the attainment of axial compactness, is the arrangement of the driving links in areas removed from those occupied by the operating levers of the clutch. This may be arrived at by centering the links circumferentially between the radial axes of adjacent pairs of levers, or by locating the links radially beyond the outer ends of the levers. Thus the levers and the driving links may be disposed in the same plane of rotation, making for axial compactness.

Another object of the invention is to provide an improved flexible drive arrangement of the type described above, in a friction clutch embodying a cover which is formed with peripheral arched regions providing, between the cover and the flywheel, a plurality of ventilating openings for inducing a circulation of cooling air through the clutch, and also giving access to the pressure plate, permitting balancing operations subsequent to the assembly of the clutch. At the same time, the invention aims to maintain maximum strength in the cover. These objects are attained by arranging the driving links circumferentially between the arched regions of the cover, making it possible to drill into the edge of the pressure plate for balancing operation without any danger of damaging the attaching elements of the flexible driving link.

Other objects, the advantages and uses of the invention will become more apparent after reading the following specification and claims, and after consideration of the drawing forming a part of the specification, wherein:

Fig. 1 is a plan view of a portion of a friction clutch embodying the invention;

Fig. 2 is a sectional view thereof taken as indicated by the line 2—2 of Fig. 1;

Fig. 3 is a sectional view thereof taken as indicated by the line 3—3 of Fig. 1;

Fig. 4 is a side elevation taken as indicated by the line 4—4 of Fig. 1;

Fig. 5 is a side elevation of the driving link in its unstressed state.

As an example of one form in which the invention may be embodied, I have shown in the drawing a clutch of the type employed in motor vehicles, including a cover 10 attached to the flywheel 11 of the vehicle engine, a pressure plate 12, and a driven element 13 having friction facings 14 adapted to be engaged between the flywheel 11 and pressure plate 12 respectively. Suitable means, located either in the clutch or externally of the clutch, may be provided for urging the pressure plate 12 toward the flywheel 11 for clutch engagement. The clutch incorporates a plurality of radial levers 15 which may function either to withdraw the pressure plate from its clutch engaging position against the pressure of engagement springs incorporated in the clutch, or to transmit the pressure of a remotely located spring to the pressure plate, it being immaterial to the present invention whether the levers are release levers or engagement levers. The levers shown in the example selected for illustration herein happen to be designed for transmitting pressure to rather than relieving pressure from the pressure plate.

Referring now to Fig. 2, the cover 10 includes a rear wall 16, a circular outer peripheral wall 17, and an inner axial wall 18 forming roughly a channel-shaped cross-section, and defining, in conjunction with the flywheel 11, an annular chamber C, in which the ring-shaped pressure plate 12 is accommodated. The peripheral wall 17 terminates in an outwardly turned peripheral flange 19 which is preferably polyhedral in shape as shown in Fig. 1, to provide corner regions which are indented axially to form lands 20 engaging the flywheel 11 and secured thereto by suitable securing elements such as cap screws 21 (Fig. 4). Thus the flange 19 is slightly spaced axially from the flywheel 11 so as to permit air to flow from the center to the periphery of the clutch through the pressure plate chamber C.

The levers 15 extend through openings 22 in the inner wall 18 of the cover, the outer end regions thereof being indicated at 23.

Drive is transmitted from the cover 10 to the pressure plate 12 through the medium of thin flexible metal straps 24 each secured at one end to the cover as by means of a rivet 25 and at its other end to the pressure plate as by means of a rivet 28. The region of the cover to which the link is secured, is indented as at 26 toward the pressure plate 12, and the region of the pressure plate to which the other end of the link is secured, is in the form of an axially offset ear 27. Thus the driving link is secured directly to the pressure plate and cover respectively and yet is positioned intermediate the two, spaced axially from both. This permits the link to flex freely so as to accommodate relative axial movement between the pressure plate and cover plate, without interference with either.

The indented region 26 serves the double function of spacing the body of the link 24 away from the cover 10, and accommodating the head of the rivet 25 so that the latter does not project beyond the plane of the rear face of the cover.

The rivet 28 has a head in the form of a retainer cup 29 of drawn sheet metal, the edge of which is flanged outwardly as at 31 to coact with the cover in limiting separation of the cover and pressure plate. The ear 27 gives access to both ends of the rivet for the upsetting operation which is necessary in securing the parts together, a notch 40 being provided in the periphery of the pressure plate to accommodate the end of the rivet.

The flanged peripheral region 19 of the cover 10 is formed with alternate straight side portions 19c and arched side portions 19d. Defined between the arched portions 19d and the flywheel 11 are a series of ventilating openings 39 which provide for ample flow of air over the pressure plate, the entire clutch functioning in the manner of a centrifugal blower to force a circulation of air from the center of the clutch to the periphery. The driving straps 24 are accommodated in the straight side portions of the cover, being thus disposed circumferentially intermediate the arched portions 19d. One advantage in this arrangement arises from the fact that the straight side portions are inherently stronger than the arched portions, and the weakening effect of the opening 30 is therefore of less moment where the opening is in the straight side portion. Another advantage of the arrangement has to do with the balancing of the pressure plate by drilling holes as for example the holes 37 shown in Fig. 4, in bosses 38 provided in the edge of the pressure plate for that purpose. Access to the bosses is provided by the openings 39. In order to facilitate the balancing operation, it is desirable to have the bosses 38 as evenly distributed around the periphery of the pressure plate as is practicable under the circumstances. Consequently the bosses are located near the ends of the openings 39. In some cases it may be necessary to drill quite deeply before a balance is obtained. If the driving links were disposed in the openings 39, this might give rise to the necessity for drilling into one of the rivets 28 by means of which the links 24 are secured to the pressure plate. This of course would weaken the driving connection between the link and the pressure plate and would therefore be undesirable. The location of the driving straps intermediate the arched portions 19d avoids this problem.

It is contemplated that the driving links may, in addition to their main function of transmitting torque, be also adapted to serve as retractor springs. To this end, they may be made of spring metal, given an initial shape such as that shown in Fig. 5, and assembled under pre-tension in such a manner as to yieldingly urge the pressure plate toward released position. When thus assembled the links are preferably straight as shown, so as to avoid the development of axial components of torque load opposing the pressure of the engagement spring.

I claim:

1. In a friction clutch, a flywheel and a pressure plate between which a driven plate is adapted to be engaged, a cover attached to the flywheel and forming therewith a chamber in which the pressure plate is enclosed, said cover having a peripheral region formed with circumferentially spaced arched portions, defining with the flywheel a series of ventilating openings, and a flexible driving strap disposed between the cover and the pressure plate, extending generally circumferentially, attached at its respective ends to the cover and the pressure plate, and positioned circumferentially intermediate a pair of said arched regions.

2. In a friction clutch, a flywheel and a pressure plate between which a driven plate is adapted to be engaged, a cover attached to the flywheel and forming therewith a chamber in which the pressure plate is enclosed, the peripheral region of said cover being formed with circumferentially spaced axially arched portions defining with the flywheel a series of ventilating openings, and a series of flexible driving links positioned circumferentially intermediate said arched portions and each disposed between and attached at its respective ends to said cover and pressure plate.

3. In a friction clutch, a flywheel and a pressure plate between which a driven plate is adapted to be engaged, a cover attached to the flywheel and forming therewith a chamber in which the pressure plate is enclosed, the peripheral region of said cover being formed with circumferentially spaced axially arched portions defining with said flywheel a series of ventilating openings, the regions of the cover intermediate said arched portions being substantially channel shaped in cross section, and a series of flexible driving links enclosed in said intermediate regions, disposed between and attached at their respective ends to the cover and the pressure plate, and extending generally circumferentially.

HAROLD NUTT.